(12) United States Patent
Teraguchi

(10) Patent No.: US 7,116,252 B2
(45) Date of Patent: Oct. 3, 2006

(54) ENCODER AND SIGNAL ADJUSTMENT METHOD FOR THE SAME

(75) Inventor: Mikiya Teraguchi, Kawasaki (JP)

(73) Assignee: Mitutoyo Corporation, Kawasaki (JP)

( * ) Notice: Subject to any disclaimer, the term of this patent is extended or adjusted under 35 U.S.C. 154(b) by 0 days.

(21) Appl. No.: 11/151,286

(22) Filed: Jun. 14, 2005

(65) Prior Publication Data
US 2005/0280563 A1    Dec. 22, 2005

(30) Foreign Application Priority Data
Jun. 21, 2004   (JP)   ............................. 2004-182691

(51) Int. Cl.
*H03M 1/06* (2006.01)
(52) U.S. Cl. ...................... 341/118; 341/155
(58) Field of Classification Search .................. 341/11, 341/6, 118, 155; 702/189
See application file for complete search history.

(56) References Cited

U.S. PATENT DOCUMENTS

| | | | | |
|---|---|---|---|---|
| 5,252,825 A | * | 10/1993 | Imai et al. ............. | 250/231.18 |
| 5,506,579 A | * | 4/1996 | Spaulding ................. | 341/11 |
| 5,625,310 A | * | 4/1997 | Takeishi ................... | 327/233 |
| 5,706,219 A | * | 1/1998 | Ishimoto .................. | 708/313 |
| 5,719,789 A | * | 2/1998 | Kawamata ................ | 702/189 |

FOREIGN PATENT DOCUMENTS

| | | |
|---|---|---|
| JP | SHO 54-19773 | 2/1979 |
| JP | B2 3202316 | 6/2001 |

\* cited by examiner

*Primary Examiner*—Peguy JeanPierre
(74) *Attorney, Agent, or Firm*—Oliff & Berridge, PLC

(57) ABSTRACT

An encoder includes: a detector; an A/D converter for performing A/D conversion for a two-phase analog signal output from the detector; an error correction circuit for correcting an error of the two-phase analog signal; an interpolation circuit for performing interpolation from the corrected result of A/D conversion; a memory for storing correction data; and a central processing unit (CPU) having communication means. The result of A/D conversion of the two-phase analog signal is sent by the communication means to an external personal computer. The error of sine and cosine signals from a predetermined value is detected by the personal computer and is sent by the communication means. The encoder performs interpolation in which the error is corrected by using the received correction data. Thus, it is possible to perform signal adjustment without observing a display screen of an oscilloscope, while confirming a status of signal adjustment in a non-stepped manner. This enables optimum adjustment and confirmation to be performed, and reduces an interpolation error caused by adjustment of the encoder signal.

16 Claims, 11 Drawing Sheets

(1) Sensor signal condition
    Phase A [Amplitude = 1.0, Offset = 0.2]
    Phase B [Amplitude = 1.0, Offset = 0.0, Phase error = 0.0 deg]

(2) Display of sensor signal (3) Polar coordinate display of sensor signal (4) Display of interpolation error (1) Sensor signal condition
   Phase A [Amplitude = 1.0, Offset = 0.0]
   Phase B [Amplitude = 1.2, Offset = 0.0, Phase error = 0.0 deg]

(2) Display of sensor signal (3) Polar coordinate display of sensor signal (4) Display of interpolation error (1) Sensor signal condition Phase A [Amplitude = 1.0, Offset = 0.0]

Phase B [Amplitude = 1.0, Offset = 0.0, Phase error = 10.0 deg]

(2) Display of sensor signal (3) Polar coordinate display of sensor signal (4) Display of interpolation error (1) Sensor signal condition Phase A [Amplitude = 1.0, Offset = 0.05]

Phase B [Amplitude = 0.95, Offset = -0.05, Phase error = -5.0 deg]

(2) Display of sensor signal (3) Polar coordinate display of sensor signal (4) Display of interpolation error

ENCODER AND SIGNAL ADJUSTMENT METHOD FOR THE SAME

CROSS-REFERENCE TO RELATED APPLICATION

The disclosure of Japanese Patent Application No. 2004-182691 filed on Jun. 21, 2004 including specifications, drawings and claims is incorporated herein by reference in its entirety.

BACKGROUND OF THE INVENTION

1. Field of the Invention

The present invention relates to an encoder and a signal adjustment method for the encoder. More particularly, the present invention relates to an encoder that enables easy signal adjustment and is suitable for use in a separate type absolute (ABS) linear encoder in which a scale and a detection head are provided separately or rotary encoder, and also relates to a signal adjustment method for that encoder.

2. Description of the Related Art

An encoder for detecting a position from two-phase analog signals formed by a sine wave and a cosine wave generally includes an interpolation (division) circuit in order to detect a change of the position (the moving amount) that is smaller than a period of the signal, as described in Japanese Patent Laid-Open Publication No. Sho 54-19773. The encoder equally divides the signal period at a predetermined pitch so as to obtain resolution smaller than the signal period.

The interpolation circuit calculates a phase angle $\theta$ from the following expression, assuming that the sine wave (phase B) signal and the cosine wave (phase A) signal output from the encoder have a central voltage, amplitude, and a phase difference that are predetermined, as shown in FIG. 1.

$$\theta = \arctan(\sin\theta/\cos\theta) \quad (1)$$

However, in the case where the central voltage, amplitude, or phase difference of at least one of the sine and cosine waves is not coincident with the predetermined value, the detected phase angle (the change amount of the position equal to or smaller than the signal period) does not have a constant pitch and an error (interpolation error) coincident with the signal period occurs, as shown in FIGS. 2 to 5. FIG. 2 shows an example of the interpolation error in the case where the phase A signal has an offset of 0.2. FIG. 3 shows an example of the interpolation error in the case where the amplitudes of the phase A signal and the phase B signal are 1.0 and 1.2, respectively. That is, FIG. 3 shows a case where there is an amplitude difference between the phase A signal and the phase B signal. FIG. 4 shows an example of the interpolation error in the case where the phase B signal has a phase error of 10°. FIG. 5 shows an example of the interpolation error in the case where the phase A signal has the amplitude of 1.0 and the offset of 0.05 and the phase B signal has the amplitude of 0.95, the offset of −0.05 and the phase error of −5°. That is, FIG. 5 shows the case where the offset, the amplitude difference, and the phase error occur at the same time.

Thus, in case of using a conventional encoder, it is necessary to adjust a signal from the encoder to have a central voltage, amplitude, and a phase difference that are predetermined, while observing the signal (e.g., a Lissajous waveform of the phase A signal and the phase B signal) on an oscilloscope.

The adjustment while observing a display screen of the oscilloscope requires skills. In order to overcome this problem, an encoder is proposed which includes a comparator for determining whether or not a signal having a predetermined level is obtained and outputting a determination result indicating that the determined signal is not an optimum signal inside (or outside) the encoder, as proposed in Japanese Patent No. 3202316. In this case, it is possible to confirm whether or not a predetermined signal is obtained, without using the oscilloscope.

However, the encoder described in Japanese Patent No. 3202316 does not have a self-adjustment function. Therefore, in the case where a range of a signal level in which the comparator determines the signal as the optimum signal is made smaller, mechanical adjustment during attachment of the encoder becomes more difficult. On the other hand, in the case where the above range is made larger, a tolerance of a signal error also becomes larger, resulting in increase in the interpolation error.

On the other hand, an ABS encoder that can detect an absolute position is widely used in machine tool or industrial machinery that includes an encoder for the reasons that (1) the ABS encoder does not require zero return at starting and (2) the ABS encoder does not require a magnetic-pole detector of a linear motor when the encoder is used for feed-back of the linear motor, and other reasons. The ABS encoder includes a multi-track encoder, and synthesizes signals obtained from multiple tracks so as to obtain the absolute position.

Synthesis of the signals from the multiple tracks uses a CPU. An encoder including the CPU therein has been commonly used.

SUMMARY OF THE INVENTION

The present invention aims to overcome the aforementioned problems of the conventional techniques. It is an object of the present invention to provide an encoder including a CPU therein, that enables easy signal adjustment so as to obtain an optimum signal to be performed without making a Lissajous waveform close to a perfect circle while observing a display screen of an oscilloscope, or providing a comparator for outputting a comparison result indicating that a signal of the encoder falls within a predetermined range or the like in the encoder.

In order to achieve the object described above, according to an aspect of the present invention, an encoder comprises: a detector; means for performing A/D conversion for an analog signal having at least two phases, the signal being output from the detector; means for correcting an error of the analog signal; an interpolation circuit for performing interpolation from a result of A/D conversion of the analog signal that is corrected; means for storing correction data; and central processing means having communication means.

The encoder may send the result of A/D conversion of the analog signal to an external device by the communication means; the external device may detect the error of the signal from a predetermined value and send the error to the encoder by the communication means; and the encoder may perform interpolation for which error correction is performed by using the received correction data.

In order to achieve the object described above, according to another aspect of the present invention, an encoder comprises: a detector; means for performing A/D conversion for an analog signal having at least two phases, the analog signal being output from the detector; means for detecting an error of the analog signal; means for correcting the error of the analog signal; an interpolation circuit for performing interpolation from a result of A/D conversion of the analog signal that is corrected; means for storing correction data; and central processing means having communication means.

The encoder may send the result of A/D conversion of the analog signal after correction to an external device by the communication means, and the external device may display and determine the corrected signal.

According to the present invention, it is possible to perform signal adjustment with high precision without using an oscilloscope. Moreover, a status of signal adjustment can be confirmed in a non-stepped manner, not by a stepped indication using LEDs as described in Japanese Patent No. 3202316. Furthermore, it is possible to confirm fine data, instead of a result of rough adjustment. Therefore, optimum adjustment and confirmation are possible.

Especially, when the external device such as a personal computer is made to have a storage function, adjustment data of each encoder can be collectively managed.

These and other novel features and advantages of the present invention will become apparent from the following detailed description of preferred embodiments.

BRIEF DESCRIPTION OF THE DRAWINGS

The preferred embodiments will be described with reference to the drawings, wherein like elements have been denoted throughout the figures with like reference numerals, and wherein.

DETAILED DESCRIPTION OF THE PREFERRED EMBODIMENTS

Preferred embodiments of the present invention will be now described in detail with reference to the accompanying drawings.

Figure 1:
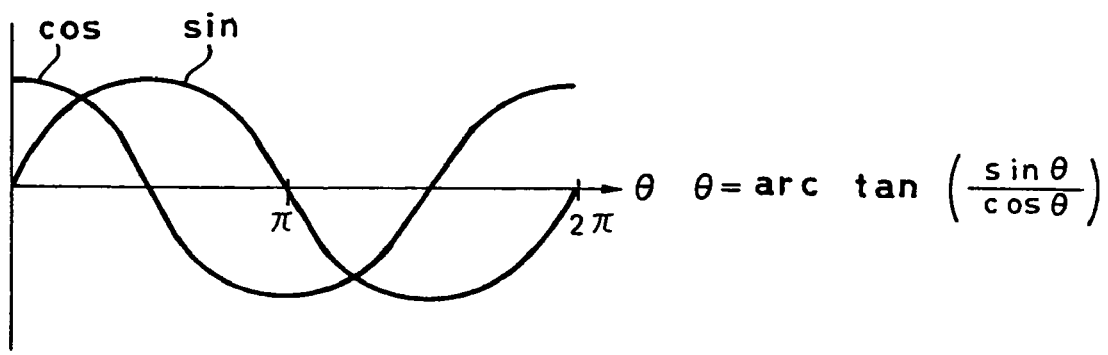
FIG. 1 is a diagram for explaining the principle of interpolation in an encoder.
Figure 2:
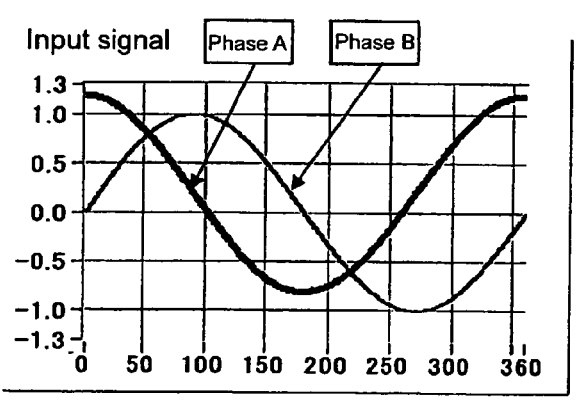
FIG. 2 is a diagram showing an effect of an offset in order to explain a problem of a conventional technique.
Figure 2:
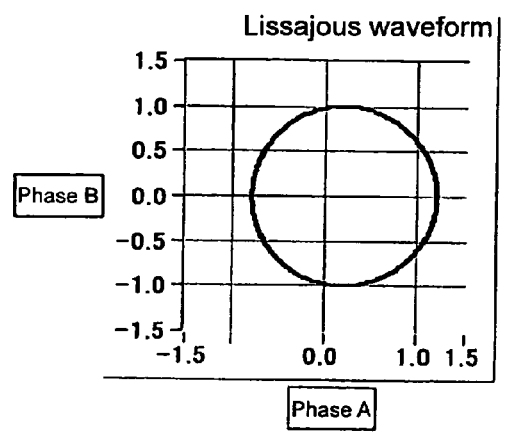
Figure 2:
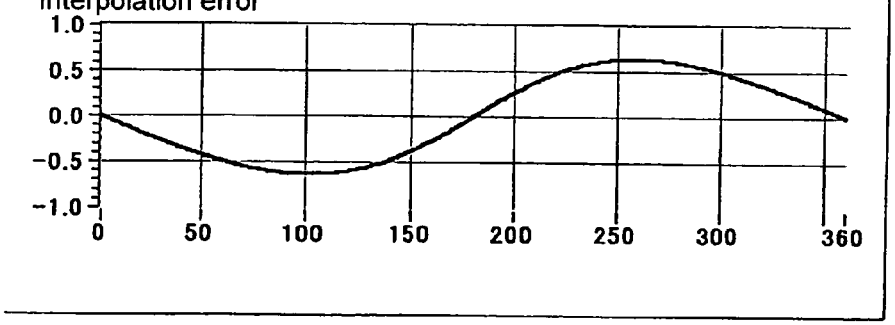
Figure 3:
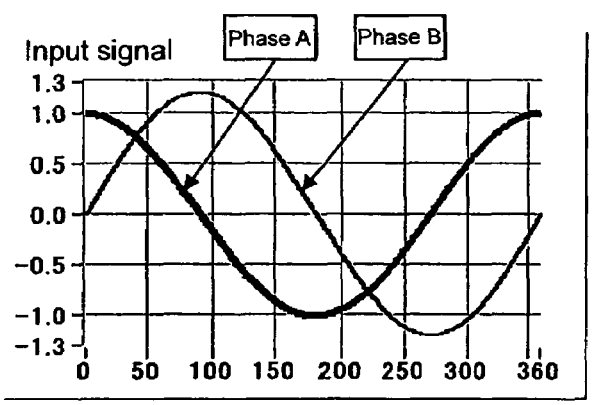
FIG. 3 is a diagram showing an effect of an amplitude difference in order to explain the problem of the conventional technique.
Figure 3:
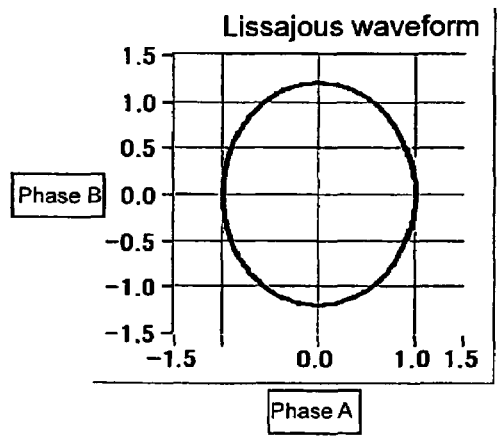
Figure 3:
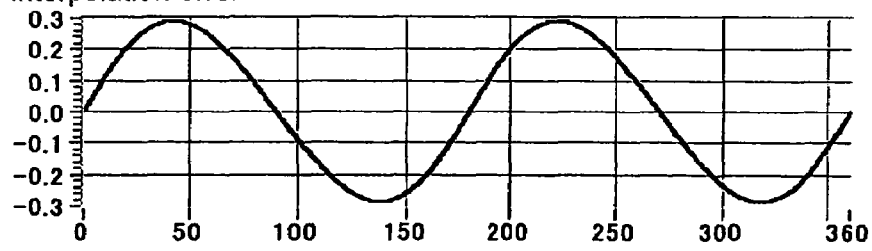
Figure 4:
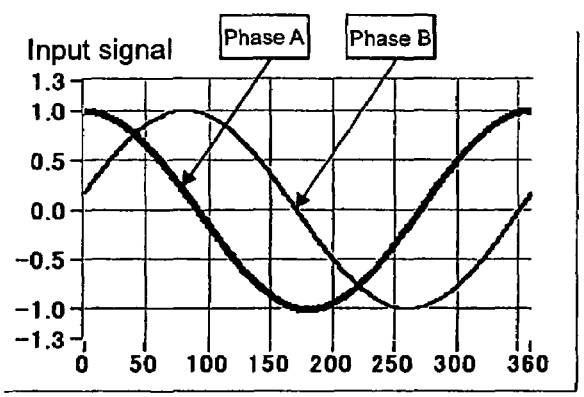
FIG. 4 is a diagram showing an effect of a phase error in order to explain the problem of the conventional technique.
Figure 4:
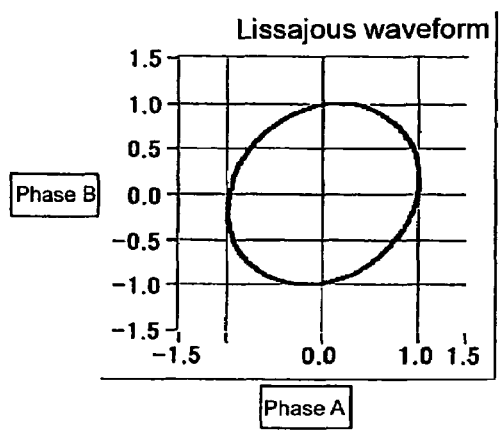
Figure 4:
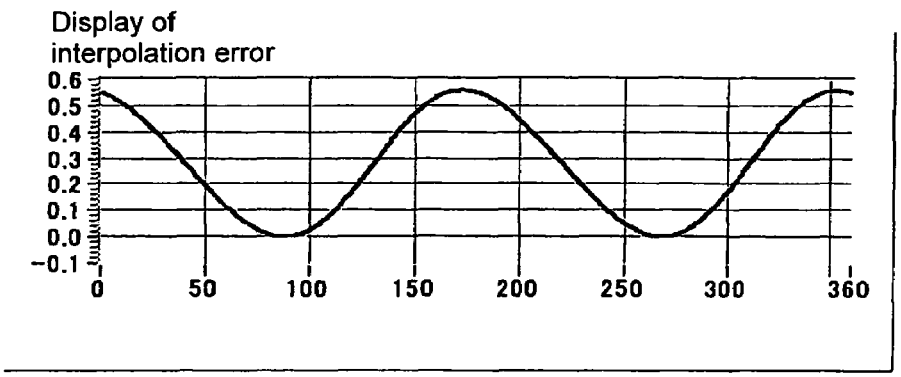
Figure 5:
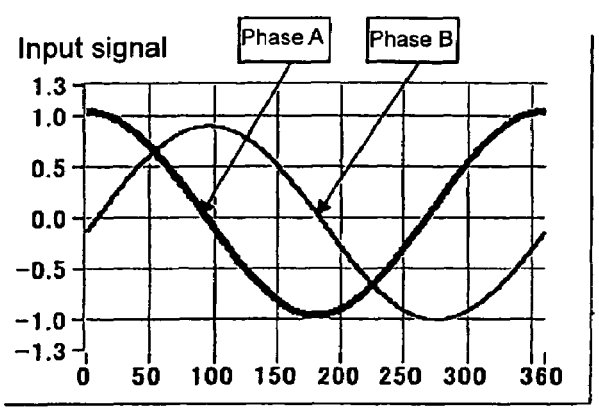
FIG. 5 is a diagram showing a composite effect of the offset, the amplitude difference, and the phase error in order to explain the problem of the conventional technique.
Figure 5:
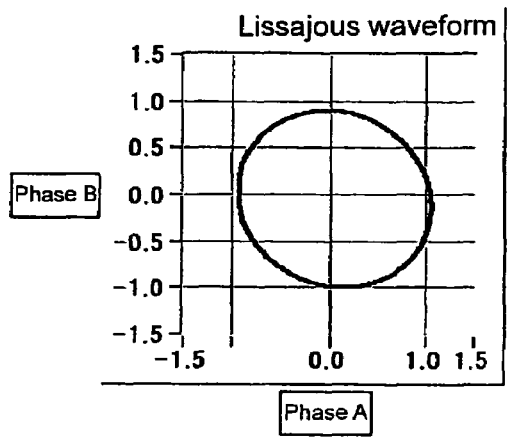
Figure 5:
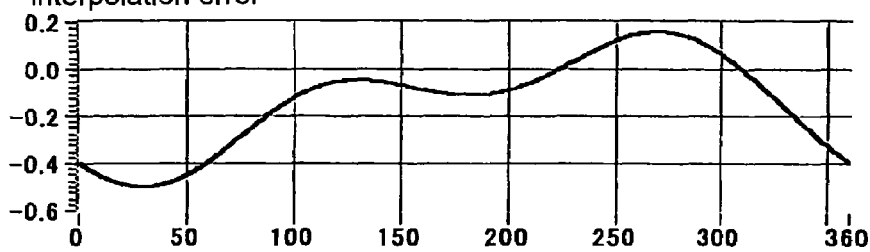
Figure 6:
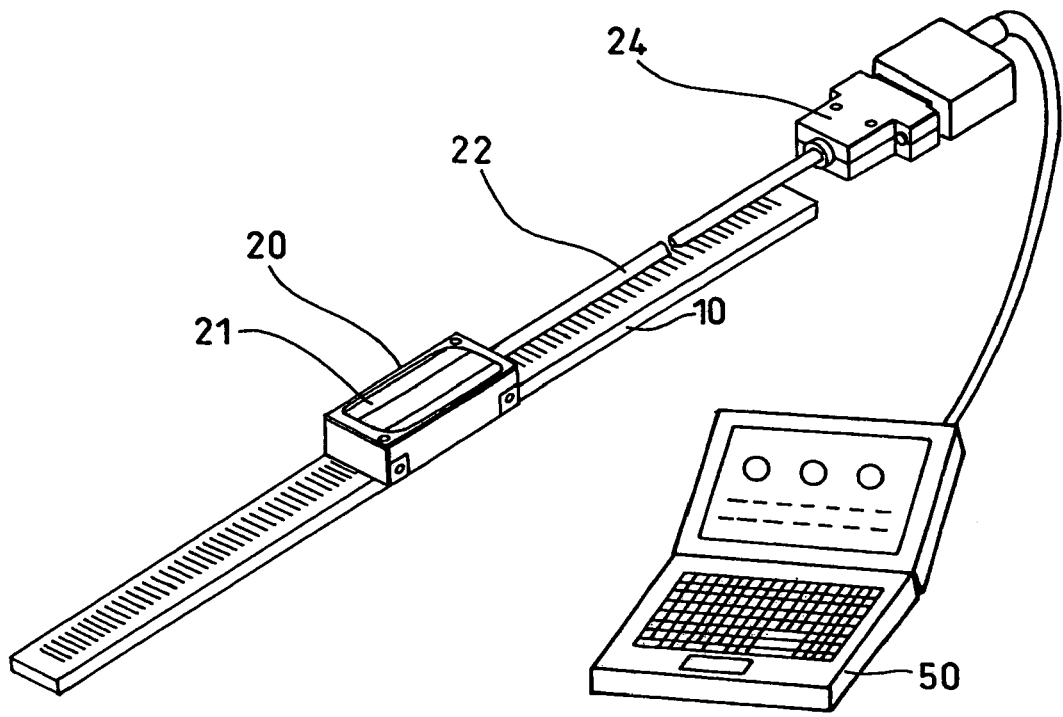
FIG. 6 is a perspective view showing connection during signal adjustment in a first embodiment of the present invention.
Figure 7:
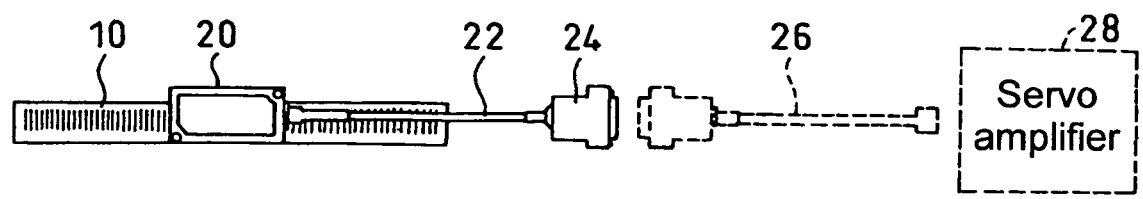
FIG. 7 is a front view showing final connection in the first embodiment.

The first embodiment of the present invention mainly includes: a scale base 10 attached to one portion of a machine (not shown), that is a scale-integrated type, for example; a detection head 20 that is fixed to another portion of the machine away from the scale base 10 by a predetermined distance and includes an LED 21 for indicating power-on and an alarm; a head cable 22 and an output connector 24 for connecting the detection head 20 to a feed-back cable 26 and a servo amplifier 28 of the machine after completion of adjustment, as shown in FIG. 7; and a personal computer (PC) 50 that is connected to the output connector 24 during adjustment, instead of the servo amplifier 28, as shown in FIG. 6.

Figure 8:
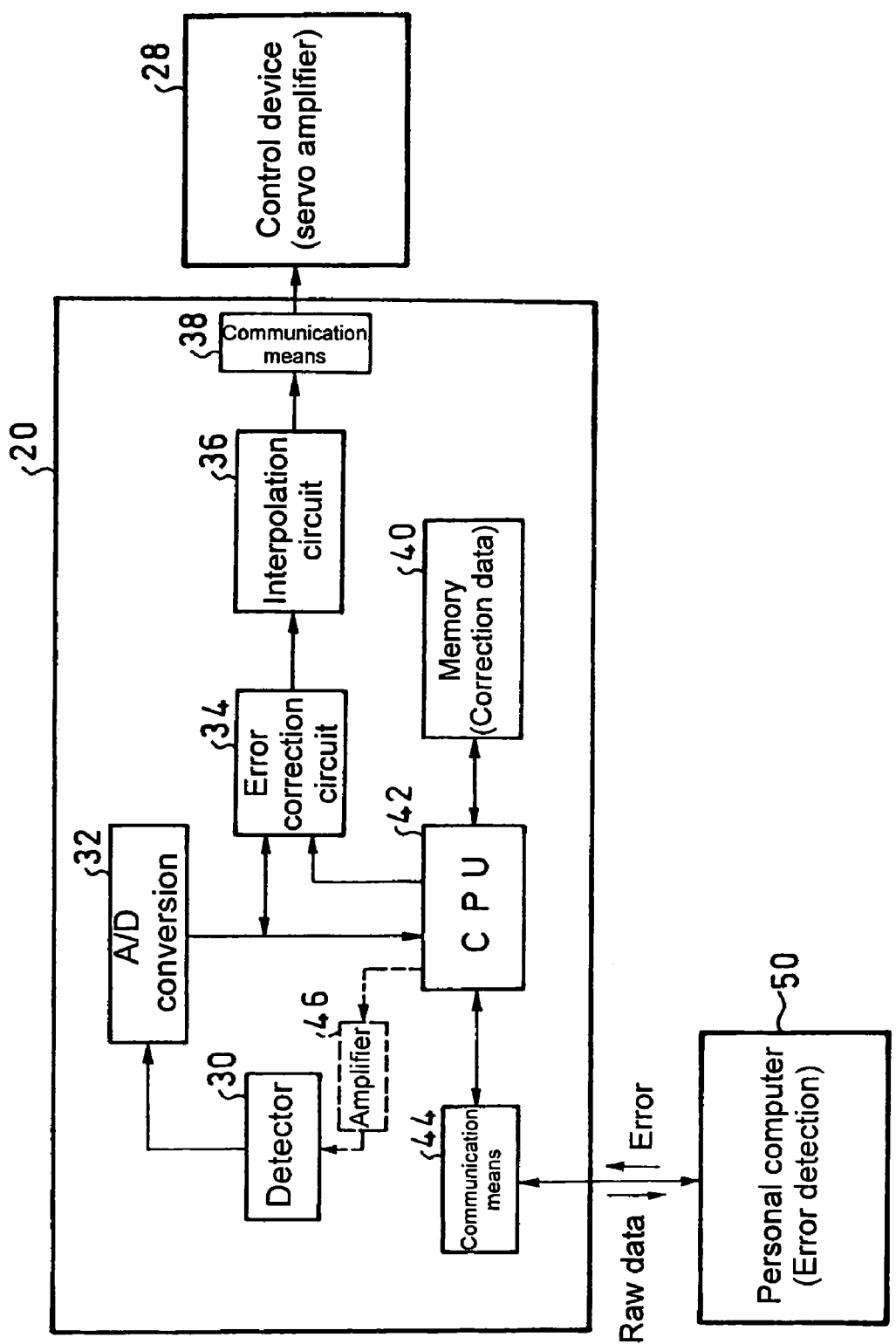
FIG. 8 is a block diagram of an internal structure according to the first embodiment.

FIG. 8 shows details of the detection head 20. As shown in FIG. 8, the detection head 20 includes a 3-track photo-electric type detector 30 having a light-emitting device and a light-receiving device, for example; an A/D converter 32 for performing A/D conversion for a sine wave signal and a cosine wave signal that form a two-phase analog signal output from the detector 30; an error correction circuit 34 for correcting an error of the aforementioned sine and cosine wave signals (a central voltage difference, an amplitude difference, and a phase difference); an interpolation circuit 36 for performing interpolation from the result of A/D conversion of signals corrected by the error correction circuit 34; communication means 38 for outputting an output of the interpolation circuit 36 to a control device (servo amplifier 28); a memory 40 for storing correction data; and a central processing unit (CPU) 42 having communication means 44 for communicating with the personal computer 50.

In the present embodiment, the result of A/D conversion of the sine wave and the cosine wave by the A/D converter 32 (i.e., raw data) is sent to the personal computer 50 that is an external device by the communication means 44. The personal computer 50 then detects an error of the sine wave signal and the cosine wave signal from a predetermined value.

The error is then sent from the personal computer 50 to the detection head 20 by the communication means 44. The detection head 20 performs interpolation in which error correction is performed, by using correction data that is received and stored in the memory 40. Thus, it is possible to perform optimum signal adjustment and confirmation. Moreover, the adjusted signal can be confirmed by displaying waveforms obtained by performing error correction for data of the sine wave and cosine-wave that are sent from the detection head 20, on the personal computer 50.

Figure 9:
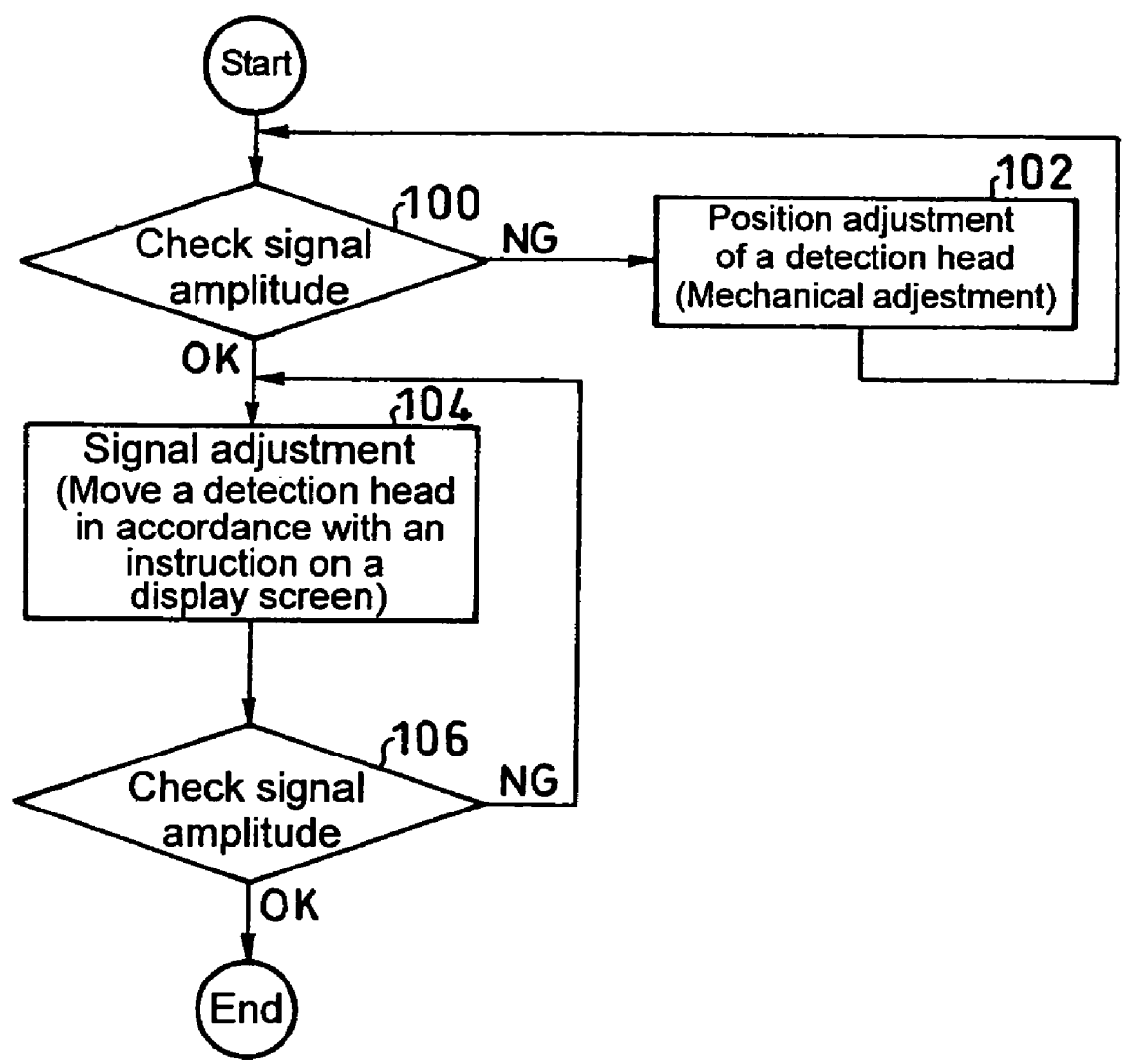
FIG. 9 is a flowchart of a procedure according to the first embodiment.

A specific procedure is shown in FIG. 9.

First, the amplitude of a signal is checked in Step 100. When a result of the check in Step 100 is No, i.e., it is determined that the signal amplitude is insufficient, the procedure goes to Step 102 in which the position of the detection head 20 is mechanically adjusted. The adjustment of the signal amplitude may be achieved by additionally providing an amplifier 46 having a variable gain in the detection head 20 (as shown by a dashed line in FIG. 8) and adjusting the amplitude of a signal input to the detector 30 by using an output of the CPU 42. In this case, a range in which the amplitude can be adjusted can be made larger.

When the result of the determination in Step 100 is Yes, the procedure goes to Step 104 in which signal adjustment is performed. More specifically, while the detection head 20 is scanned over the entire length of the scale 10 in accordance with an instruction displayed on a display screen, for example, it is confirmed whether or not the LED 21 indicates an abnormal state. Based on a lighting state of the LED 21, necessary adjustment is performed.

When lighting of the LED 21 does not occur over the entire length of the scale 10 as a result of the adjustment, the signal amplitude is checked again in Step 106. When there is no problem, the signal adjustment is ended and the detection head 20 is fixed to the other portion of the machine at that position.

Figure 10:
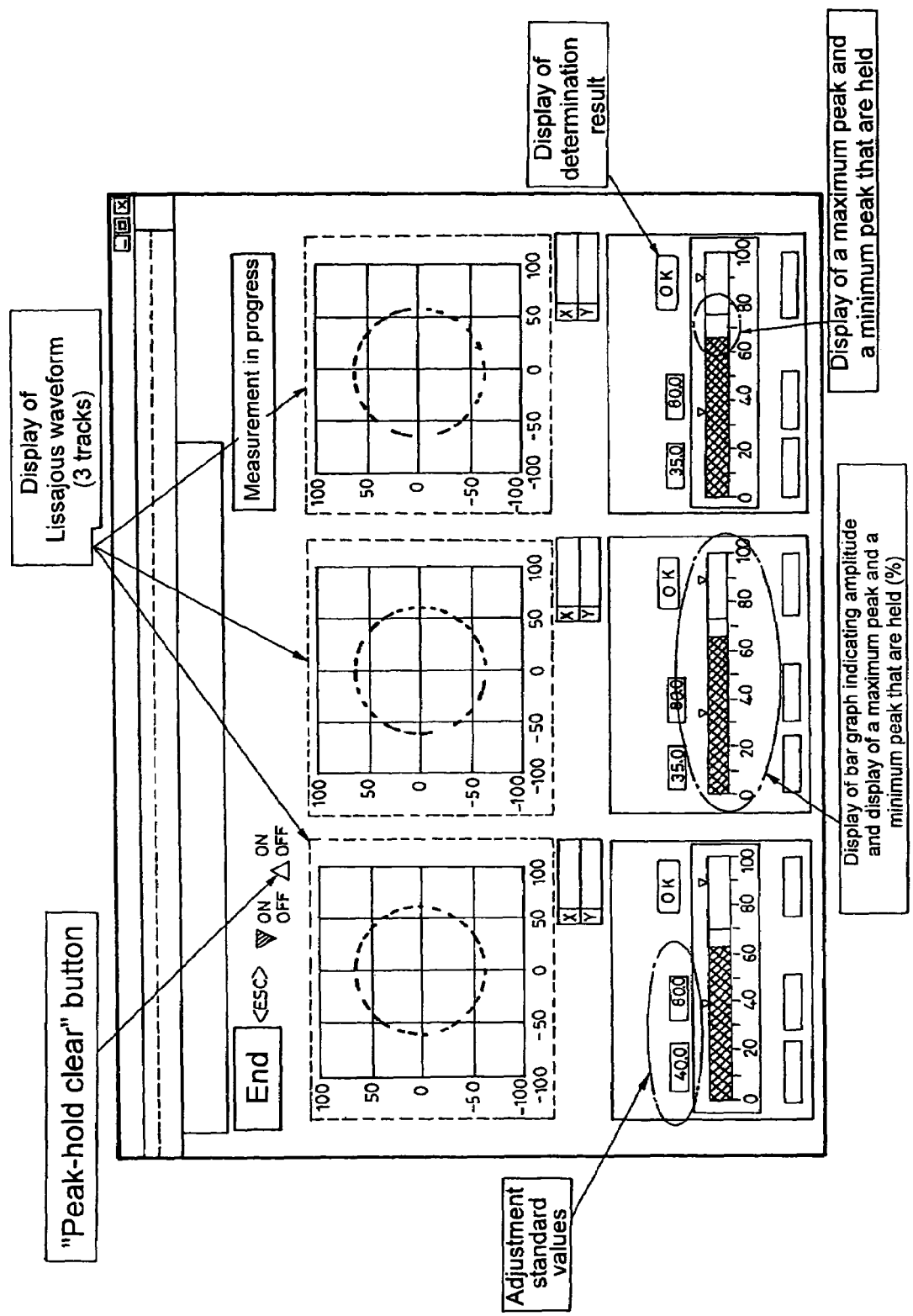
FIG. 10 illustrates an exemplary display screen during adjustment in the first embodiment.

FIG. 10 shows an exemplary display screen of the personal computer 50 during adjustment. This display screen corresponds to a case where there are three tracks on the scale. When the detection head 20 is scanned with respect to the scale 10, Lissajous signals of the respective tracks are displayed.

Figure 11:
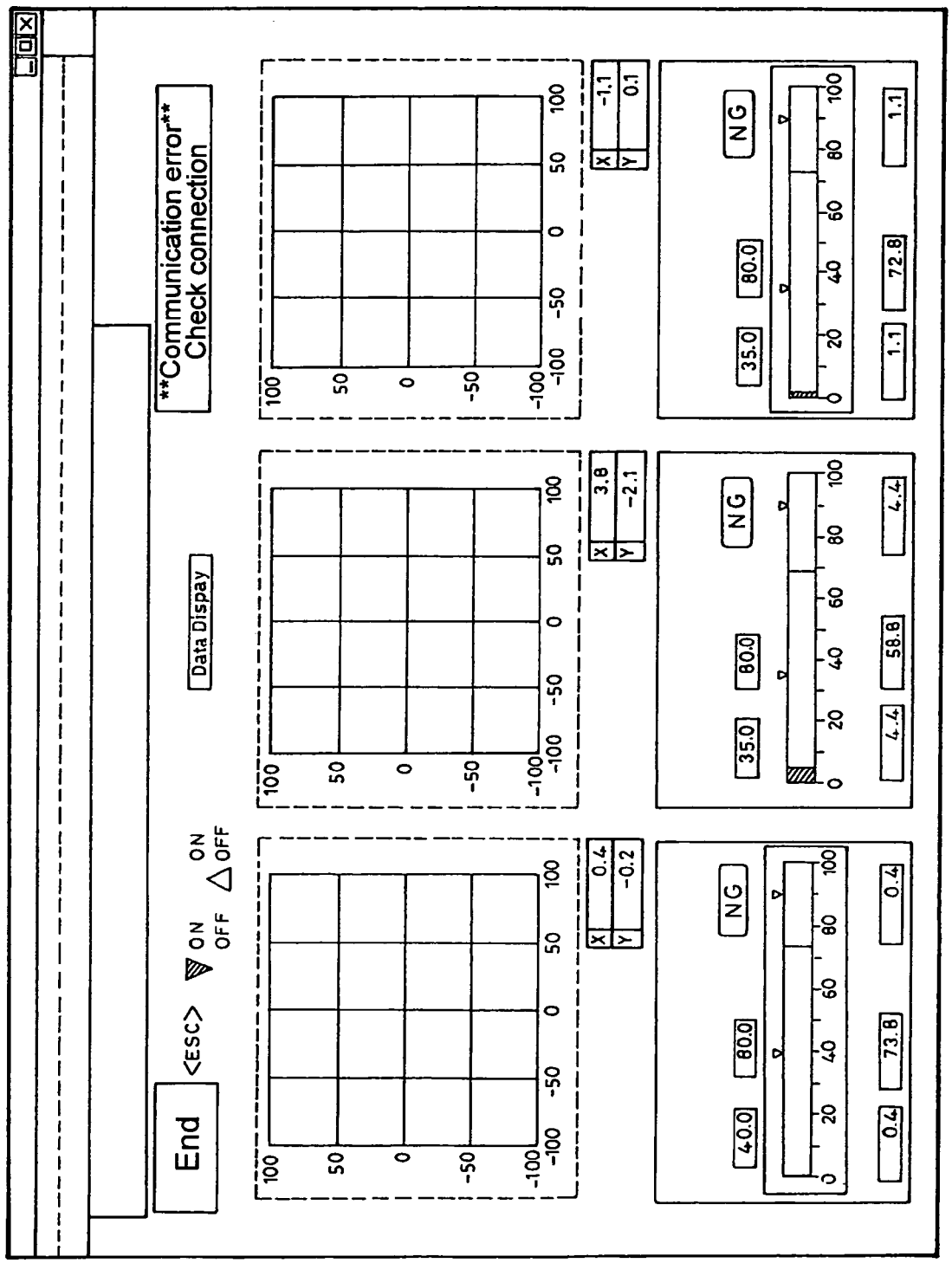
FIG. 11 illustrates an exemplary display screen when a communication error occurs in the first embodiment.

In this manner, it is possible to adjust and fix the detection head 20 at an appropriate position with respect to the scale 10. In the case where no communication is performed because of a trouble in a power source or a connecting cable, a message indicating a communication error is displayed, as shown in FIG. 11. Thus, it is possible to urge an inspecting person to check the power source or the connecting cable.

In the present embodiment, detection of the error of the sine and cosine wave signals is performed in the personal computer 50 externally provided. Thus, the structure of the detection head 20 is relatively simple.

Next, the second embodiment of the present invention is described. In this embodiment, the error detection is not performed in the external device, but is performed in the detection head 20.

Figure 12:
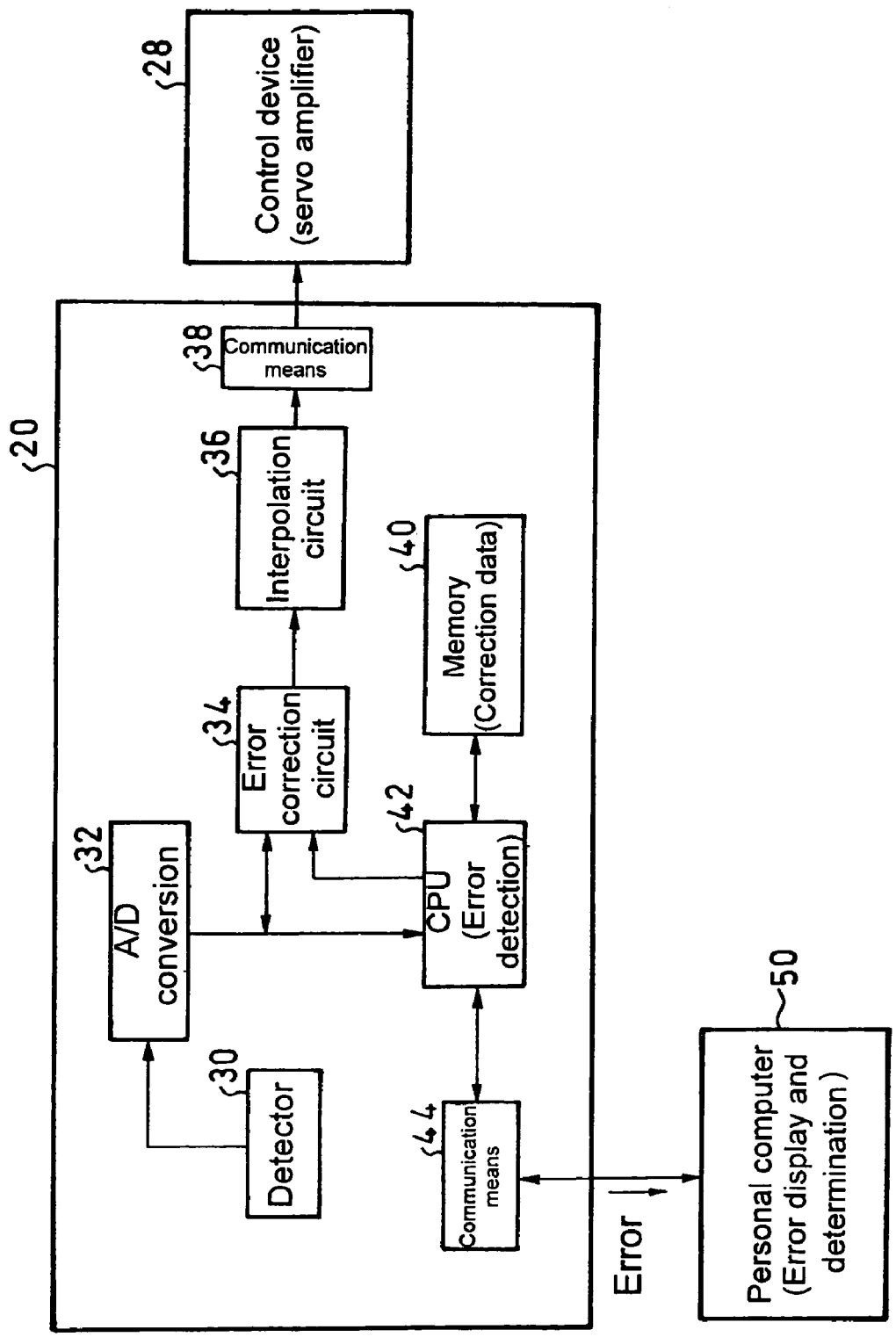
FIG. 12 is a block diagram of an internal structure according to a second embodiment of the present invention.

In this embodiment, error detection is performed in the CPU 42 in an arrangement similar to that in the first embodiment, as shown in FIG. 12.

Except for the above, the present embodiment is the same as the first embodiment. Therefore, detailed description of the present embodiment is omitted.

In the present embodiment, not raw data but an error detected by the CPU 42 is sent from the communication means 44 to the personal computer 50. Therefore, it is possible to easily determine whether or not optimum adjustment is performed by displaying and determining the corrected signal on the personal computer 50.

Although the present invention is applied to the separate type linear scale in which the scale and the detection head are provided separately in the aforementioned embodiments, an application of the present invention is not limited thereto. The present invention can be used for confirming an adjustment result in a separate type rotary encoder or an integrated type encoder.

Moreover, the number of the phases of the analog signal is not limited to two. For example, the present invention can be applied to an encoder that outputs a three-phase analog signal with a phase difference of 120°. In this case, the three-phase analog signal is input to a known three-phase to two-phase conversion circuit so as to obtain a two-phase analog signal. Then, the thus obtained two-phase analog signal is processed in a similar manner to that described in the above embodiments.

It should be apparent to those skilled in the art that the above-described embodiments are merely illustrative which represent the application of the principles of the present invention. Numerous and varied other arrangements can be readily devised by those skilled in the art without departing from the spirit and the scope of the invention.

What is claimed is:

1. An encoder comprising:
    a detector;
    means for performing A/D conversion for an analog signal having at least two phases, the signal being output from the detector;
    means for correcting an error of the analog signal after A/D conversion;
    an interpolation circuit for performing interpolation from a result of A/D conversion of the analog signal that is corrected;
    means for storing correction data; and
    central processing units having communication means with an external device for sending the result of A/D conversion data to the external device, receiving an error of the signal from the external device and storing the error as the correction data.

2. The encoder according to claim 1, further comprising means for displaying an abnormal state during signal adjustment.

3. A method for adjusting a signal of an encoder, the encoder comprising:
    a detector;
    means for performing A/D conversion for an analog signal having at least two phases, the signal being output from the detector;
    means for correcting an error of the analog signal after A/D conversion;
    an interpolation circuit for performing interpolation from a result of A/D conversion of the analog signal that is corrected;
    means for storing correction data; and
    central processing units having communication means with an external device, the method comprising the steps of:
    sending the result of A/D conversion of the analog signal to the external device by the communication means;
    allowing the external device to detect the error of the signal from a predetermined value and to send the error to the encoder by the communication means; and
    allowing the encoder to perform interpolation for which error correction is performed by using the received correction data.

4. The method for adjusting a signal of an encoder according to claim 3, wherein
    the analog signal is a two-phase signal converted from a three-phase signal.

5. The method for adjusting a signal of an encoder according to claim 3, wherein
    the external device is a personal computer.

6. The method for adjusting a signal of an encoder according to claim 3, wherein
    the signal transmitted from the encoder and a waveform for which the error is corrected are displayed on the external device.

7. The method for adjusting a signal of an encoder according to claim 3, wherein
    the signal adjustment is achieved by mechanically adjusting a position of the detector or adjusting a gain of an amplifier provided in the detector when an amplitude of the signal is insufficient; and
    then adjusting the signal while scanning the detector.

8. The method for adjusting a signal of an encoder according to claim 3, wherein
    a message indicating a communication error is displayed when no communication is performed.

9. An encoder comprising:
    a detector;
    means for performing A/D conversion for an analog signal having at least two phases, the analog signal being output from the detector;
    means for detecting an error of the analog signal;
    means for correcting the error of the analog signal after A/D conversion;

an interpolation circuit for performing interpolation from a result of A/D conversion of the analog signal that is corrected;

means for storing correction data; and central processing units having communication means with an external device for sending the error of the signal to the external device for displaying and determining a corrected signal.

10. The encoder according to claim 9, further comprising means for displaying a status of adjustment.

11. A method for adjusting a signal of an encoder, the encoder comprising:

a detector;

means for performing A/D conversion for an analog signal having at least two phases, the analog signal being output from the detector;

means for detecting an error of the analog signal;

means for correcting the error of the analog signal after A/D conversion;

an interpolation circuit for performing interpolation from a result of A/D conversion of the analog signal that is corrected;

means for storing correction data; and central processing units having communication means with an external device, the method comprising the steps of:

sending the result of A/D conversion of the analog signal after correction to the external device; and allowing the external device to display and determine the corrected signal.

12. The method for adjusting a signal of an encoder according to claim 11, wherein the analog signal is a two-phase signal converted from a three-phase signal.

13. The method for adjusting a signal of an encoder according to claim 11, wherein the external device is a personal computer.

14. The method for adjusting a signal of an encoder according to claim 11, wherein the signal transmitted from the encoder and a waveform for which the error is corrected are displayed on the external device.

15. The method for adjusting a signal of an encoder according to claim 11, wherein the signal adjustment is achieved by mechanically adjusting a position of the detector or adjusting a gain of an amplifier provided in the detector when an amplitude of the signal is insufficient; and then adjusting the signal while scanning the detector.

16. The method for adjusting a signal of an encoder according to claim 11, wherein a message indicating a communication error is displayed when no communication is performed.

* * * * *